US008255546B2

(12) United States Patent
Horton et al.

(10) Patent No.: US 8,255,546 B2
(45) Date of Patent: Aug. 28, 2012

(54) PEER NAME RESOLUTION PROTOCOL SIMPLE APPLICATION PROGRAM INTERFACE

(75) Inventors: Noah Horton, Sammamish, WA (US); David G. Thaler, Redmond, WA (US); Brian R. Lieuallen, Redmond, WA (US); Upshur Warren Parks, III, Bothell, WA (US); Jeremy L. Dewey, Redmond, WA (US); Todd R. Manion, Redmond, WA (US); Scott A. Senkeresty, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1561 days.

(21) Appl. No.: 11/241,393

(22) Filed: Sep. 30, 2005

(65) Prior Publication Data

US 2007/0076630 A1    Apr. 5, 2007

(51) Int. Cl.
*G06F 15/16* (2006.01)
*G06F 15/173* (2006.01)
*H04L 12/28* (2006.01)

(52) U.S. Cl. ......... 709/228; 709/238; 709/250; 370/254
(58) Field of Classification Search .................. None
See application file for complete search history.

(56) References Cited

U.S. PATENT DOCUMENTS

| 5,586,264 | A | * | 12/1996 | Belknap et al. ............... 725/115 |
| 5,987,376 | A | * | 11/1999 | Olson et al. .................. 701/201 |
| 6,205,481 | B1 | * | 3/2001 | Heddaya et al. ............. 709/226 |
| 6,252,884 | B1 | | 6/2001 | Hunter |
| 6,269,099 | B1 | * | 7/2001 | Borella et al. ................. 370/389 |
| 6,636,854 | B2 | * | 10/2003 | Dutta et al. ............................ 1/1 |
| 6,674,459 | B2 | * | 1/2004 | Ben-Shachar et al. ..... 348/14.09 |
| 6,725,281 | B1 | | 4/2004 | Zintel et al. |
| 6,748,420 | B1 | * | 6/2004 | Quatrano et al. ............. 709/205 |
| 6,779,004 | B1 | | 8/2004 | Zintel |
| 6,801,974 | B1 | | 10/2004 | Watts, Jr. et al. |
| 6,892,230 | B1 | | 5/2005 | Gu et al. |
| 6,898,200 | B1 | * | 5/2005 | Luciani ......................... 370/352 |
| 7,051,102 | B2 | * | 5/2006 | Gupta et al. .................. 709/226 |
| 7,065,587 | B2 | * | 6/2006 | Huitema et al. .............. 709/245 |
| 7,185,194 | B2 | * | 2/2007 | Morikawa et al. ............. 713/156 |
| 7,251,694 | B2 | * | 7/2007 | Gupta et al. .................. 709/226 |
| 7,277,946 | B2 | * | 10/2007 | Humphrey et al. ........... 709/226 |
| 7,336,623 | B2 | * | 2/2008 | Huitema ....................... 370/254 |
| 7,418,479 | B2 | * | 8/2008 | Gupta et al. .................. 709/216 |
| 7,533,184 | B2 | * | 5/2009 | Miller et al. .................. 709/236 |
| 7,774,495 | B2 | * | 8/2010 | Pabla et al. ................... 709/238 |
| 7,817,647 | B2 | * | 10/2010 | Lieuallen et al. ............. 370/401 |
| 7,826,396 | B2 | * | 11/2010 | Miller et al. .................. 370/255 |
| 7,848,332 | B2 | * | 12/2010 | Lee et al. ................... 370/395.5 |

(Continued)

OTHER PUBLICATIONS

International Search Report for PCT/US2006/038627 mailed Feb. 15, 2007.

(Continued)

*Primary Examiner* — David England
(74) *Attorney, Agent, or Firm* — Microsoft Corporation

(57) ABSTRACT

An application program interface (API) for sending and receiving endpoint registration data and peer-to-peer network cloud data has a registration call for adding endpoint data to a peer-to-peer network. The API may receive explicit data regarding address information or may be instructed to select and maintain suitable address information as the topology of the peer-to-peer network changes. Blocking and non-blocking calls are exposed for retrieving information peer-to-peer network endpoint data.

20 Claims, 4 Drawing Sheets

U.S. PATENT DOCUMENTS

| | | | |
|---|---|---|---|
| 2002/0027569 A1 | 3/2002 | Manni et al. | |
| 2002/0075900 A1* | 6/2002 | Turina et al. | 370/467 |
| 2002/0112058 A1 | 8/2002 | Weisman et al. | |
| 2002/0143989 A1* | 10/2002 | Huitema et al. | 709/243 |
| 2002/0156875 A1* | 10/2002 | Pabla | 709/220 |
| 2003/0041141 A1* | 2/2003 | Abdelaziz et al. | 709/223 |
| 2003/0055892 A1* | 3/2003 | Huitema et al. | 709/204 |
| 2003/0056093 A1* | 3/2003 | Huitema et al. | 713/156 |
| 2003/0056094 A1* | 3/2003 | Huitema et al. | 713/157 |
| 2003/0097425 A1 | 5/2003 | Chen | |
| 2003/0117433 A1 | 6/2003 | Milton et al. | |
| 2003/0158839 A1* | 8/2003 | Faybishenko et al. | 707/3 |
| 2003/0188010 A1 | 10/2003 | Raza et al. | |
| 2003/0196060 A1* | 10/2003 | Miller | 711/170 |
| 2003/0204626 A1* | 10/2003 | Wheeler | 709/245 |
| 2003/0204742 A1* | 10/2003 | Gupta et al. | 713/200 |
| 2003/0217140 A1* | 11/2003 | Burbeck et al. | 709/224 |
| 2004/0111469 A1 | 6/2004 | Manion et al. | |
| 2004/0111515 A1 | 6/2004 | Manion et al. | |
| 2004/0148333 A1 | 7/2004 | Manion et al. | |
| 2004/0148611 A1* | 7/2004 | Manion et al. | 719/328 |
| 2004/0162871 A1* | 8/2004 | Pabla et al. | 709/201 |
| 2004/0181487 A1* | 9/2004 | Hanson | 705/52 |
| 2004/0190549 A1 | 9/2004 | Huitema | |
| 2004/0213220 A1* | 10/2004 | Davis | 370/389 |
| 2004/0236863 A1* | 11/2004 | Shen et al. | 709/231 |
| 2004/0249907 A1 | 12/2004 | Brubacher et al. | |
| 2004/0255029 A1 | 12/2004 | Manion et al. | |
| 2004/0260800 A1 | 12/2004 | Gu et al. | |
| 2005/0004916 A1* | 1/2005 | Miller et al. | 707/10 |
| 2005/0022210 A1 | 1/2005 | Zintel et al. | |
| 2005/0074018 A1 | 4/2005 | Zintel et al. | |
| 2005/0091529 A1 | 4/2005 | Manion et al. | |
| 2005/0097503 A1 | 5/2005 | Zintel et al. | |
| 2005/0108371 A1 | 5/2005 | Manion et al. | |
| 2005/0157659 A1* | 7/2005 | Huitema | 370/254 |
| 2005/0177715 A1 | 8/2005 | Somin et al. | |
| 2005/0216556 A1* | 9/2005 | Manion et al. | 709/204 |
| 2006/0077911 A1* | 4/2006 | Shaffer et al. | 370/260 |
| 2006/0193265 A1* | 8/2006 | Simionescu et al. | 370/254 |
| 2007/0076630 A1* | 4/2007 | Horton et al. | 370/254 |

OTHER PUBLICATIONS

Written Opinion for PCT/US2006/038627 mailed Feb. 15, 2007.

"Teredo Overview," Microsoft Corporation, website, 30 pages available at http://www.microsoft.com/technet/prodtechnol/winxppro/maintain/teredo.mspx, © 2003 Microsoft Corporation.

The Cable Guy, "Windows Peer-to-Peer Networking: The Cable Guy—Nov. 2003," updated Aug. 5, 2004, Microsoft TechNet, 7 pages.

D. Box, "Code Name Indigo: A Guide to Developing and Running Connected Systems With Indigo," dated Jan. 2004, MSDN Magazine, 11 pages.

D. Chappell, "Introducing Indigo: An Early Look," (Longhorn Technical Articles) dated Feb. 2005, Microsoft.com Library, 18 pages.

New Zealand Examination Report cited in related application No. 566833 dated Oct. 19, 2009.

Int. Preliminary Report on Patentability cited in PCT Application No. PCT/US2006/038627 dated Apr. 10, 2008.

"Peer-to-Peer Infrastructure: Identity manager Functions", Microsoft, Copyright 2004, reprinted from the Internet at: http://msdn.microsoft.com/library/en-us/p2psdk/p2p/identity_manager_functions.asp?frame on Apr. 5, 2005.

"Peer-to-Peer Infrastructure: Grouping API Functions", Microsoft, Copyright 2004, reprinted from the Internet at: http://msdn.microsoft.com/library/en-us/p2psdk/p2p/grouping_api_functions.asp?frame=true on Jul. 13, 2005.

"Peer-to-Peer Infrastructure: PeerGroupEnumMembers", Microsoft, Copyright 2004, reprinted from the Internet at: http://msdn.microsoft.com/library/en-us/p2psdk/p2p/Peergroupenummembers.asp?frame on Apr. 5, 2005.

"Peer-to-Peer Infrastructure: Creating a Group Chat Application", Microsoft, Copyright 2004, reprinted from the Internet at: http://msdn.microsoft.com/library/en-us/p2psdk/p2p/creating_a_group_chat_application.asp on Apr. 5, 2005.

* cited by examiner

PEER NAME RESOLUTION PROTOCOL SIMPLE APPLICATION PROGRAM INTERFACE

BACKGROUND

Peer-to-peer networking offers users many opportunities for collaboration and sharing by connecting computers associated by geography or network characteristics. The chance to offer and discover services, files, data, and programmatic offerings increases flexibility and utilization of computing resources.

A peer-to-peer network may include similar groupings of computers in clusters known as clouds. Clouds may be identified by their scope or by other attributes such as a department it is associated with. Multiple clouds may exist within a given company or organizational entity. Offerings available on the peer-to-peer network are known as endpoints. Endpoints may be computers, files, or programs. However, endpoints may also include services that are available at more than one physical location on the peer-to-peer network, that is, a service may have multiple Internet Protocol addresses and/or IP ports.

Endpoints that wish to join or maintain contact with a peer-to-peer network may use a service called the "Peer Name Resolution Protocol" (PNRP). PNRP is currently accessible via two mechanisms, a GetAddrInfo application program interface (API) or a Winsock Namespace Provider API. The GetAddrInfo API is relatively simple but does not make available all the functionality of PNRP. The NamespaceProvider API supports all the features of PNRP but has been found cumbersome and difficult to use by some developers. Beyond the coding challenges, the prior art APIs increased the difficulty of debugging systems incorporating PNRP. The adoption of PNRP and subsequently, the robust features available through PNRP for peer-to-peer networking, has been hampered by the difficulty of using the APIs currently available.

SUMMARY

The Simple PNRP API exposes all the functions available in PNRP while simplifying the programming and management overhead associated with building and maintaining peer-to-peer networks. Broadly, there are a class of calls for registering and updating endpoint information in a peer-to-peer network and another class of calls for discovering endpoints in the peer-to-peer network. The discovery calls may be blocking or non-blocking. The use of these simplified calls is expected to increase the utilization of PNRP by streamlining both the development and use of PNRP for peer-to-peer networks.

The Simple PNRP APIs greatly eases the developer's burden for coding PNRP interfaces and simplifies the debugging process during development and testing. The Simple PNRP APIs are expected to significantly advance the adoption of PNRP and, through that, the adoption of peer-to-peer networking in an increasing number of consumer, commercial, and business applications.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
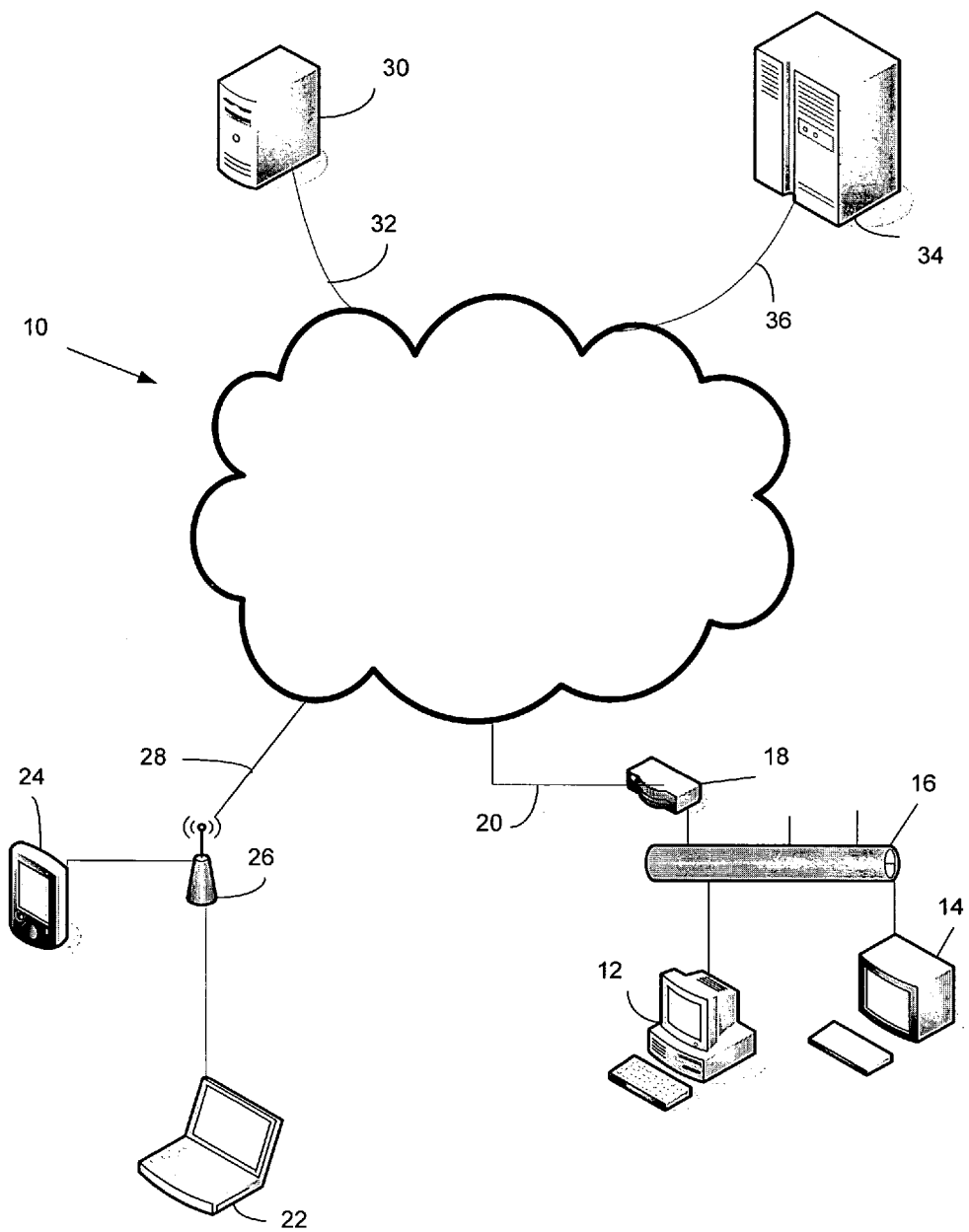
FIG. 1 is a simplified and representative block diagram of a computer network.
Figure 2:
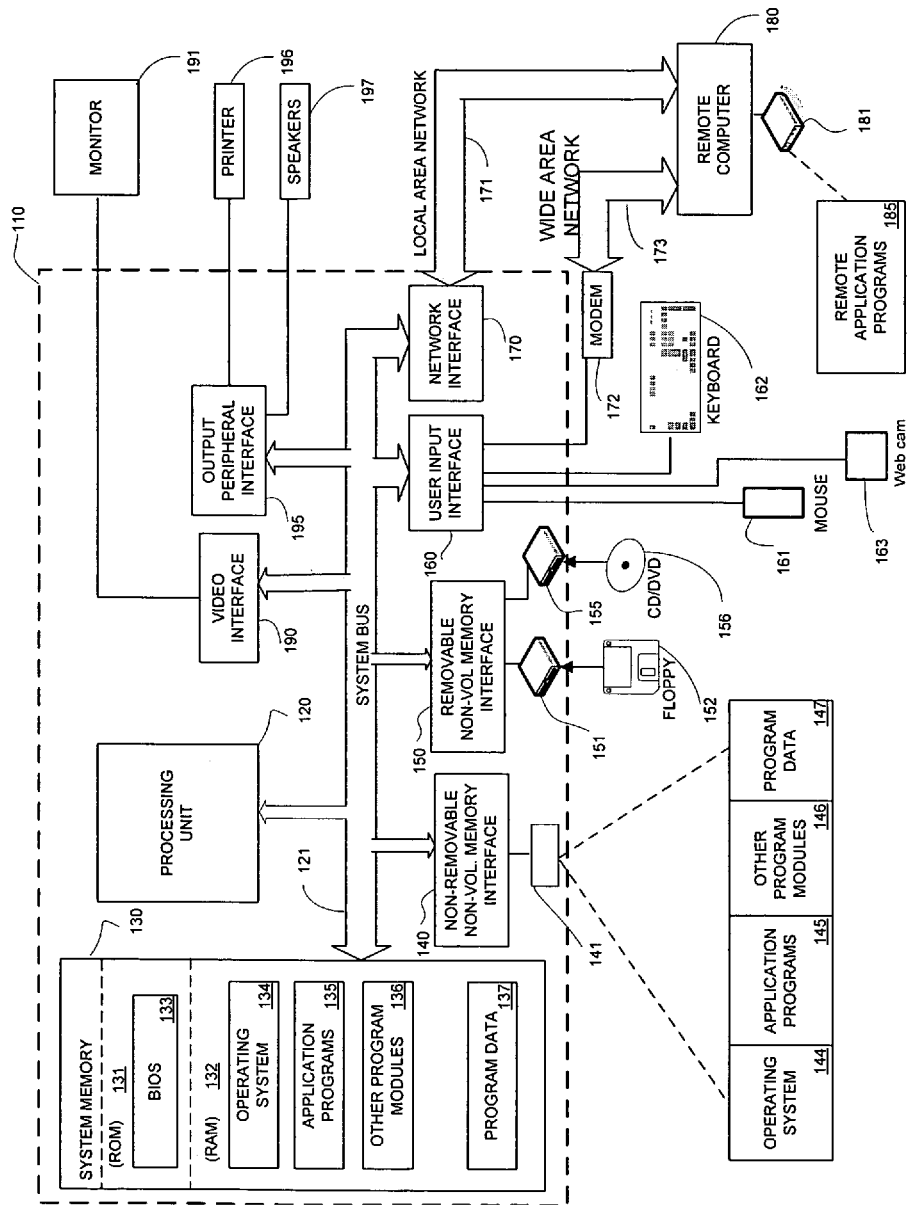
FIG. 2 is a block diagram of a computer that may be connected to the network of FIG. 1.

FIGS. 1 and 2 provide a structural basis for the network and computational platforms related to the instant disclosure.

FIG. 1 illustrates a network 10. The network 10 may be the Internet, a virtual private network (VPN), or any other network that allows one or more computers, communication devices, databases, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball, or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
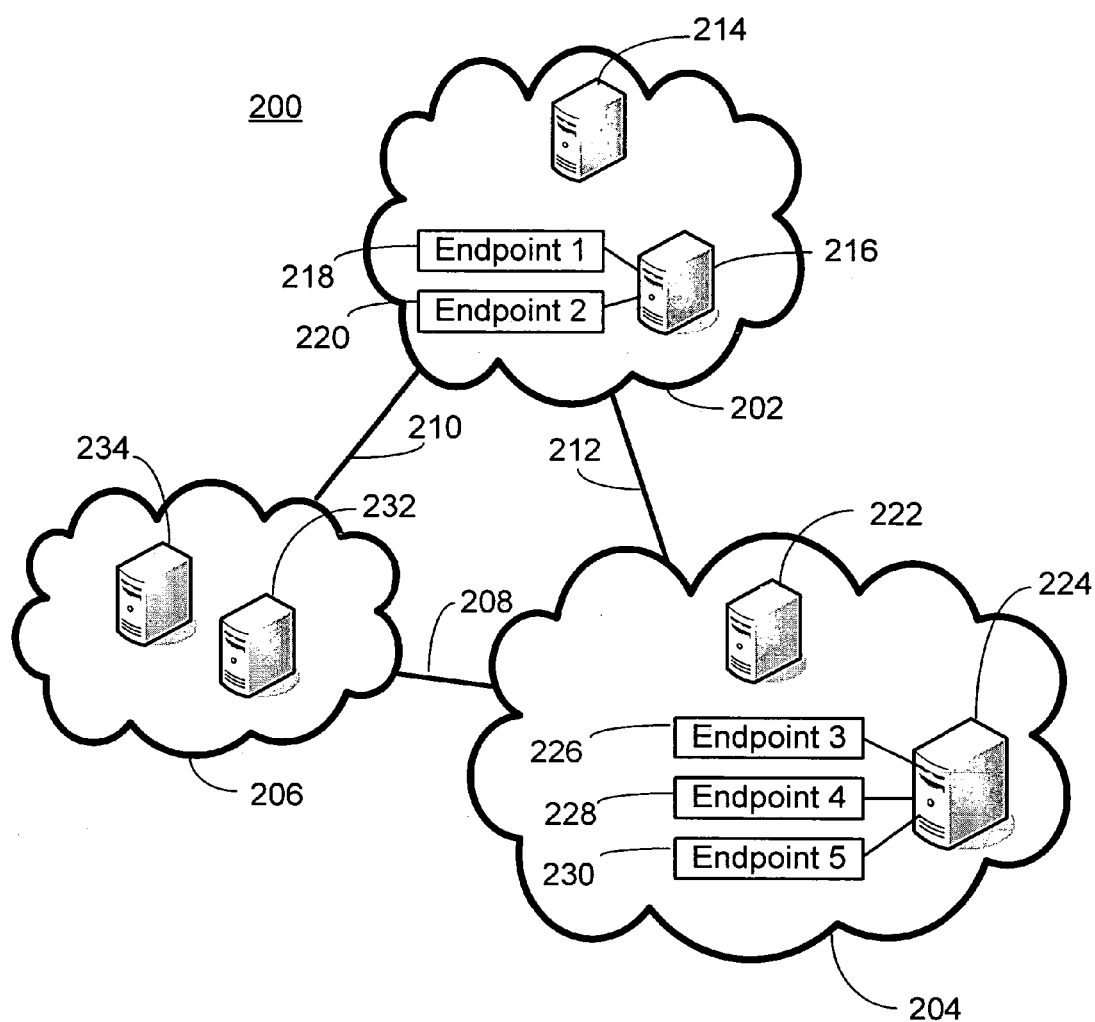
FIG. 3 is a simplified and representative block diagram of a peer-to-peer network.

FIG. 3 depicts an exemplary peer-to-peer network, that may be similar to or coupled to the network 10 of FIG. 1. A peer-to-peer network 200 may have individual clouds 202 204 206 coupled by networks 208 210 212. The networks may be wired or wireless and may support Internet protocol version 6 (IPv6). Cloud 202 may have computers 214 216. Each computer may support multiple endpoints, for example, computer 216 is shown supporting endpoint 1 218 and endpoint 2 220. Cloud 204 is shown having computers 222 and 224. Computer 224 is shown supporting three endpoints 226 228 and 230. Cloud 206 is shown having computers 232 and 234. For the sake of this example, the computers of cloud 206 are not shown supporting any endpoints. In this exemplary embodiment, each computer and its associated endpoints are shown within their respective clouds 202 204 206, indicating perhaps organization by network topology.

Each of the endpoints 218 220 226 228 230 may be processes, files, IP addresses, and the like. Each endpoint must be explicitly registered in order to be discovered on the peer-to-peer network 200, within their respective clouds. For example, when one endpoint 218 wishes to register in cloud 202 it may use the PeerPNRPRegister call documented below. The PeerPNRPRegister call may be restricted to its own link-local cloud 202. Similarly, an endpoint in cloud 204, for example, endpoint 230, may register locally in cloud 204 The PeerPNRPUpdateRegistration call may be used when data about the endpoint has changed, for example, an IP address. When an endpoint wishes to remove itself from the peer-to-peer network a PeerPNRPUnregister call may be issued. The methods by which peer-to-peer network registration information is propagated through a peer-to-peer network are known and well documented and are not discussed further here.

Figure 4:
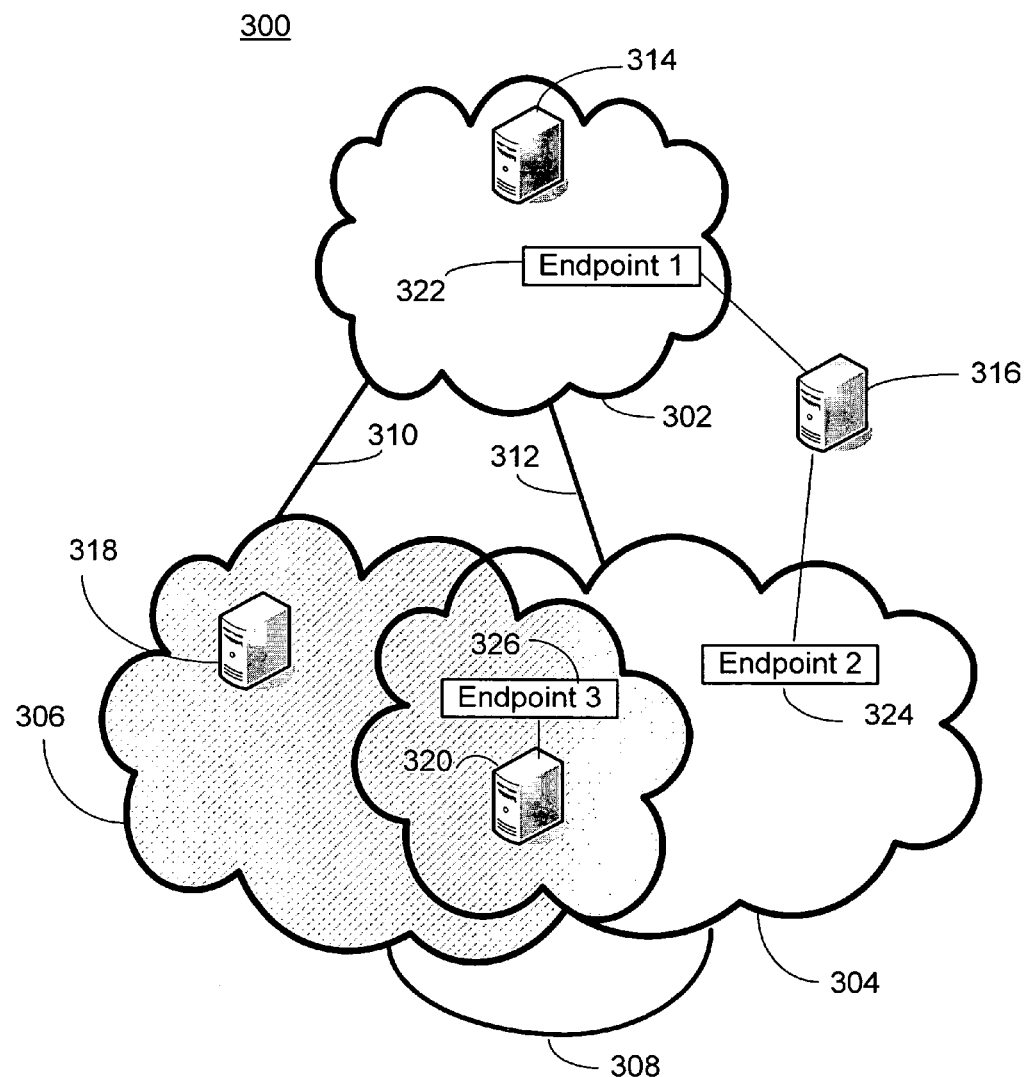
FIG. 4 is a simplified and representative block diagram of a peer-to-peer network.

FIG. 4 represents a more complex embodiment of peer-to-peer networking. The peer-to-peer network 300 has clouds 302, 304 and 306. The clouds may be coupled by respective network connections 308, 310, and 312. Computer 314 in cloud 302 may have one or more endpoints (not depicted). Computer 316 is outside any cloud but has endpoint 1 322 in cloud 302 and endpoint 2 324 in cloud 304. The computer 316 configured in this manner may be attached to different points in a topologically organized network and may be able to publish different endpoints in different networks.

Computer 318 is shown in cloud 306 while computer 320 is shown configured in both clouds 304 and 306. In this case, the computer 320 may be a logical member of both clouds 304 and 306. It may publish the endpoint 326 in both clouds simultaneously.

Input and output information and structural documentation for registration-oriented calls follow. After registration, a handle may be returned for use in future calls regarding a particular endpoint having that handle.

Any call that returns endpoint data may return a null set, in other words, no data. This may be the case when the name registration data for a cloud or endpoint cannot be matched to an existing entity. In this case, the return with no data is significant and useful.

PeerPnrpRegister—This method is used to register a PNRP endpoint. The infrastructure will pick addresses in all clouds to register, and watch for address change events, re-registering as necessary.

Syntax

```
HRESULT WINAPI PeerPnrpRegister(
   IN     PCWSTR                         pcwzPeerName,
   IN     PPEER_PNRP_REGISTRATION_INFO   pRegistrationInfo,
   OUT    PHANDLE                        phRegistration
);
```

Arguments

| | |
|---|---|
| pcwzPeerName | Name to register |
| pRegInfo | Optional information about the registration. NULL will register all addresses in all clouds. See Notes. |
| phRegistration | Handle for the registration allowing for updates and unregistration. |

```
typedef struct peer_pnrp_register_info_tag {
    PWSTR        pwzCloudName;
    ULONG        cAddresses;
    SOCKADDR     **ppAddresses;
    WORD         wPort;
    PWSTR        pwzComment;
    ULONG        cbPayload;
    PBYTE        pbPayload;
} PEER_PNRP_REGISTER_INFO,
 *PPEER_PNRP_REGISTER_INFO;
```

The PEER_PNRP_REGISTER_INFO provides additional information on how registrations should be performed. Conceptually, the simple mode for the API is passing null for this argument. Complex settings are accessed by actually using the structure.

| | |
|---|---|
| pcwzCloudName | Name of the cloud in which to register the peername, typically retrieved via PeerPnrpGetCloudInfo. Also understands the following special values:<br>* NULL: the peername will be registered in all clouds.<br>* PEER_PNRP_ALL_LINK_CLOUDS: the peername will be registered in all link local clouds<br>* PEER_PNRP_GLOBAL_CLOUD: the peername will only be registered in the global cloud. |

| | |
|---|---|
| cAddresses | Count of the number of addresses to be published. Max is 4. The value may be 0, only if a payload is specified. cAddress may also be the special value PEER_PNRP_AUTO_ADDDRESSES, which will cause the infrastructure to automatically choose good addresses for each specified cloud. |
| ppAddresses | Array of address/socket information that will be published with the name. |
| wPort | Only used when cAddress equals PEER_PNRP_AUTO_ADDRESSES. Specifies which port to publish with the address chosen by our api. See further notes below. |
| pcwzComment | Comment field string for inclusion in CPA. |
| cbPayload | The byte count of the payload. |
| pbPayload | The payload information for the registration. Required if cAddress equals 0. |

The pRegInfo in the call to PeerPnrpRegister may be NULL. This is equivalent to passing a PEER_PNRP_REGISTER_INFO with following values:

| | |
|---|---|
| pwzCloudName | NULL (All clouds) |
| cAddresses | PEER_PNRP_AUTO_ADDRESSES |
| ppAddresses | NULL |
| wPort | 0 |
| pwzComment | NULL |
| cbPayload | 0 |
| pbPayload | NULL |

When PEER_PNRP_AUTO_ADDRESSES is used (or NULL is passed the pRegInfo), not only does the API pick good values for addresses to register, but it keeps the registrations up to date. As new clouds come up, we will automatically register in them. If the addresses on the local machine change, current registrations will be updated with the new addresses.

PeerPnrpUpdateRegistration—This method is used to update a registration of a PNRP endpoint.

Syntax

```
HRESULT WINAPI PeerPnrpUpdateRegistration(
  IN  HANDLE      hRegistration,
  IN  PPEER_PNRP_REGISTRATION_INFO pRegistrationInfo);
```

Arguments

| | |
|---|---|
| hRegistration | Handle to the registration from PeerPnrpRegister |
| pRegInfo | the updated registration info |

Not all things about a registration may be changed. Specifically, the cloudname may not be changed, and cAddresses can not change between auto-selected addresses and specified addresses. The updated registration data may include data specifying one or more clouds and data about one or more address/socket information pairs, although for a given pair, the address or socket information may be null.

PeerPnrpUnregister This method removes a PNRP endpoint registration

Syntax

```
VOID WINAPI PeerPnrpUnregister(
  IN   HANDLE hRegistration
);
```

Arguments:

| | |
|---|---|
| phRegistration | Handle to the registration from PeerPnrpRegister |

A participant in the peer-to-peer network 200 may wish to gather information about resources available on the peer-to-peer network, for example, other endpoints. The Simple PNRP API supports several calls for determining information about clouds and other endpoints. Cloud information may be returned by issuing a PeerPnrpGetCloud info call, as documented below.

PeerPnrpGetCloudInfo This method will retrieve all cloud names.

Syntax

```
HRESULT WINAPI PeerPnrpGetCloudInfo(
  ULONG *pcNumClouds,
  PPEER_PNRP_CLOUD_INFO *ppCloudInfo
);
```

Arguments

| | |
|---|---|
| pcNumClouds | The number of cloud names pointed to by ppwzCloudNames |
| ppCloudInfo | The cloud information. This param must be freed via PeerFreeData. |

```
typedef struct peer_pnrp_cloud_info_tag
{
  WCHAR    wzCloudName[MAX_CLOUD_NAME];
  DWORD    dwScope;
  DWORD    dwScopeId;
} PEER_PNRP_CLOUD_INFO, *PPEER_PNRP_CLOUD_INFO;
```

There are two options for retrieving information about endpoints in the peer-to-peer network. The first initiates processes associated with retrieving endpoints from peernames and associated data in a synchronous (blocking) manner and returns results when the resolve process is completed. A second option resolves endpoints in a two step process. The first step initiates the data gathering in an asynchronous (non-blocking) manner. In most cases, this asynchronous method may offer more utility by allowing other activities, including other peer-to-peer network activities to take place in parallel. The second step involves retrieving the specific endpoint data accumulated during the non-blocking resolve step.

The synchronous (blocking) call is documented below.

PeerPnrpResolve This method performs a synchronous (blocking) resolve.

Syntax

```
HRESULT WINAPI PeerPnrpResolve(
    IN  PCWSTR      pcwzPeerName,
    IN  PCWSTR      pcwzCloudName   OPTIONAL,
    IN OUT ULONG    *pcEndpoints,
    OUT PPEER_PNRP_ENDPOINT_INFO *ppEndPointInfo
);
```

Arguments

| | |
|---|---|
| pcwzPeerName | The name to be resolved. |
| pcwzCloudName | The cloudname to perform the resolve. If NULL, resolves will be performed in all clouds. If PEER_PNRP_ALL_LINK_CLOUDS, resolves in all link local clouds. If PEER_PNRP_GLOBAL_CLOUD, resolve will only take place in the global cloud |
| pcEndpoints | On input, specifies the desired number of results. On output, specifies the actual number pointed to by ppEndpointInfo. Max is 500. |
| ppEndPointInfo | Returns an array of the resultant PNRP_ENDPOINT_INFO information. Must be freed by a call to PeerFreeData. |

For non-blocking functionality, use PeerPnrpStartResolve. To use a specific timeout, use the asynchronous version. If CloudName is null and the resolve is conducted in all clouds, then resolves will be issued in each cloud simultaneously. The method will return as soon as it has received enough results from any combination of clouds.

The asynchronous (non-blocking) call and the related calls for stopping the resolve process and retrieving results when available are documented below.

PeerPnrpStartResolve This method performs an asynchronous (non-blocking) resolve. This is the recommended way of performing resolves, especially if multiple endpoints are desired.

Syntax

```
HRESULT WINAPI PeerPnrpStartResolve(
    IN  PCWSTR  pcwzPeerName,
    IN  PCWSTR  pcwzCloudName,
    IN  ULONG   cMaxEndpoints,
    IN  HANDLE  hEvent,
    OUT PHANDLE phResolve,
);
```

Arguments

| | |
|---|---|
| pcwzPeerName | The name to be resolved. |
| pcwzCloudName | The cloud name to perform the resolve. If NULL, resolves will be performed in all clouds. |
| cMaxEndpoints | The maximum number of endpoints to return to the caller |
| hEvent | An event handle to signal when new resolves are ready for consumption by calling PeerPnrpGetEndpoint |
| phResolve | Handle which can be used to cancel the resolve via PeerPnrpStopResolve |

As results are found, the hEvent gets signaled. The application may then call PeerPnrpGetEndpoint to retrieve the resolved Endpoint(s). In another embodiment, results may be returned via a callback to the requesting process.

PeerPnrpStopResolve This method will cancel an in-progress resolve from a call to PeerPnrpStartResolve.

Syntax

```
VOID WINAPI PeerPnrpStopResolve(
    IN HANDLE hResolve
);
```

Arguments

| | |
|---|---|
| hResolve | The resolve handle from PeerPnrpStartResolve |

When the process resolving the peer-to-peer network has enough data, data is made available about the endpoints. The data may then be retrieved in the second step using the PeerPnrpGetEndpoint call.

PeerPnrpGetEndpoint This method is used to retrieve endpoints from a previous call to PeerPnrpStartResolve.

Syntax

```
HRESULT WINAPI PeerPnrpGetEndpoint(
    IN  HANDLE hResolve,
    OUT PPEER_PNRP_ENDPOINT_INFO *pEndpoint
);
```

Arguments

| | |
|---|---|
| hResolve | The resolve handle from PeerPnrpStartResolve |
| pEndpoint | A single Endpoint which was resolved as a PeerPnrpEndpointInfo struct |

Errors

| | |
|---|---|
| PEER_E_PENDING | The api was called before a resolve was ready |
| PEER_E_NO_MORE | No more endpoints are available, this resolve is complete. |

This method is part of the asynchronous resolve PnrpAPIs that also include PeerPnrpStartResolve and PeerPnrpStopResolve.

The details of a structure used to contain data about a PNRP endpoint are documented below.

PeerPnrpEndpointInfo The main data structure used to contain a PNRP Endpoint.

Syntax

```
typedef struct peer_pnrp_endpoint_info_tag {
    PWSTR        pwzPeerId;
    ULONG        cAddresses;
    PSOCKADDR *  ppAddresses;
    ULONG        cbPayload;
    PVOID        pPayload;
} PEER_PNRP_ENDPOINT_INFO,
  *PPEER_PNRP_ENDPOINT_INFO;
```

Elements

| | |
|---|---|
| pwzPeerId | The complete Peer ID of the Endpoint. |
| cAddresses | Number of address/port pairs associated with the Endpoint. |
| pAddresses | Array of address/port information that will be published with the name |
| cbPayload | The byte count of the payload |
| pPayload | The payload information for the registration. |

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computer-readable storage medium having computer-executable instructions for implementing a method of communicating data for a lifecycle support of participation in a peer-to-peer network, the method comprising:
    processing a call that sends a notification message to one or more other nodes in a cloud regarding a change of a status of an endpoint in the peer-to-peer network;
    processing a call for exchanging name registration data about at least one other endpoint in the peer-to-peer network; and
    processing a call for reporting the name registration data about the at least one other endpoint in the peer-to-peer network or a null value:
        the name registration data comprising:
            a name of a cloud in which to register the name registration data and at least one of
                a PeerPNRPAllLinkClouds or
                a PeerPNRPGlobalCloud
            request to register the name registration data in link local clouds or a global cloud respectively,
            a data structure having at least one of a peer identifier, a count of address/port pairs, an array of address/port pairs, and
            a payload corresponding to the at least one other endpoint, and the null value comprising:
                an indicator that no endpoint was found.

2. A computer-readable storage medium having computer-executable instructions of claim 1, processing the call for notifying the other nodes comprising:
    receiving a call for distributing endpoint data having a plurality of call parameters comprising a peer_name; and
    responding with a parameter comprising a registration handle associated with the endpoint.

3. A computer-readable storage medium having computer-executable instructions of claim 1, processing the call for notifying the other nodes comprising:
    receiving a PeerPnrpRegister call having a plurality of call parameters comprising at least one of a peer_name, cloud data specifying one or more clouds, and one or more address/socket information pairs.

4. A computer-readable storage medium having computer-executable instructions of claim 1, processing the call for notifying the other nodes comprising:
    receiving a call for changing registration data about an endpoint having a plurality of call parameters comprising at least one of a registration handle associated with the endpoint and an updated registration data, the updated registration data comprising at least one of cloud data specifying one or more clouds, and one or more address/socket information pairs.

5. A computer-readable storage medium having computer-executable instructions of claim 1, processing the call for notifying the other nodes comprising:
    receiving a call for removing registration data associated with an endpoint having a call parameter comprising a registration handle associated with a peer name.

6. A computer-readable storage medium having computer-executable instructions of claim 1, processing the call for exchanging name registration data comprising:
    receiving a request for gathering endpoint information in a blocking manner having a plurality of call parameters comprising at least one of a peer_name, a cloud name, and a maximum number of results to return; and
    responding with endpoint information about zero or more instances of endpoints.

7. A computer-readable storage medium having computer-executable instructions of claim 1, processing the call for exchanging name registration data comprising:
    receiving a request for gathering endpoint information in a non-blocking manner having a plurality of call parameters comprising at least one of a peer_name, a cloud name, and a maximum number of results to return.

8. A computer-readable storage medium having computer-executable instructions of claim 7, comprising returning a result by at least one of a callback and a signal having an event handle.

9. A computer-readable storage medium having computer-executable instructions of claim 1, processing the call for exchanging name registration data comprising:
    receiving a request for halting an in-process resolve request having one or more call parameters comprising at least an event handle associated with the in-process resolve request.

10. A computer-readable storage medium having computer-executable instructions of claim 1, processing the call for reporting the name registration data comprising:
    receiving a request for receiving data corresponding to results of a prior resolve request having at least a call parameter comprising an event handle associated with the prior resolve request, the event handle pointing to a data structure having information about zero or more other endpoints, the data structure having entries corresponding to zero or more peer identifiers of the zero or more other endpoints, a number of address/port pairs associated with the zero or more other endpoints, a byte count of the payload, and a payload of information for the zero or more other endpoints.

11. A method of communicating between a requesting process and a serving process supporting communication in a peer-to-peer network comprising:
    processing a call for exchanging data between a first endpoint and at least one other entity in the peer-to-peer network, with the at least one other entity being at least one of a member of a cloud and another endpoint;
processing a call for reporting the data about the at least one other endpoint in the peer-to-peer network; and
processing a call for registering one or more addresses based at least in part on a PeerPNRPAutoAddresses request comprising picking one or more values for the addresses to register, registering the addresses with one or more new clouds, and updating concurrently with an address change on a local machine.

12. The method of claim 11, processing the call for exchanging data comprising:
issuing a PeerPnrpGetCloudInfo call to retrieve one or more cloud names;
receiving the PeerPnrpGetCloudInfo call; and
issuing a response comprising a number of cloud names returned and information corresponding to the respective returned cloud names.

13. The method of claim 11, processing the call for exchanging data comprising:
issuing a PeerPnrpResolve request comprising at least one of a peer_name, a cloud name, and a maximum number of results to return;
receiving the PeerPnrpResolve request and processing the request in a blocking manner; and
issuing a response comprising an event handle for signaling availability of results and for use in retrieving the results.

14. The method of claim 11, processing the call for exchanging data comprising:
issuing a PeerPnrpStartResolve request comprising at least one of a peer_name, a cloud name, and a maximum number of results to return;
receiving the PeerPnrpStartResolve request and processing the request in a non-blocking manner; and
issuing a response comprising an event handle for signaling availability of results and for use in retrieving the results.

15. The method of claim 11, processing the call for exchanging data comprising:
issuing a PeerPnrpRegister call to add endpoint data to at least one associated cloud, the PeerPnrpRegister call comprising a peer_name;
receiving the PeerPnrpRegister call and sending data about the first endpoint and the peer_name to zero or more other entities; and
issuing a response to the requesting process comprising a registration handle associated with the endpoint data.

16. The method of claim 15, comprising issuing, by the requesting process, a second PeerPnrpRegister call, comprising:
issuing the second PeerPnrpRegister call to add endpoint data to at least one associated cloud, the second PeerPnrpRegister call comprising a peer_name and at least one registration parameter, the registration parameter comprising at least one of a cloud name, a count of addresses to publish, an array of address/socket pairs, a port for an automatically selected address, a comment field, or a payload of information corresponding to a registration.

17. The method of claim 11, processing the call for exchanging data comprising:
issuing a PeerPnrpUpdateRegistration call to update endpoint data in at least a portion of the peer-to-peer network, the PeerPnrpUpdateRegistration call comprising a peer_name and updated endpoint data; and
receiving the PeerPnrpUpdateRegistration call and sending data comprising the peer_name and updated endpoint data to at least one surrounding entity.

18. A computer adapted for participation in a peer-to-peer network comprising:
a network communication device for exchanging data via a network;
a memory storing machine-readable instructions; and
a processor for executing the machine-readable instructions that when executed perform a method comprising:
performing at least one of a synchronous blocking resolve or an asynchronous non-blocking resolve based at least in part on a name to be resolved, a cloud name to perform the resolve, a specified number of results, a cancelling handle, and a maximum number of endpoints to return;
processing a call for registering a peer-to-peer network endpoint, the call having a peer name and a single attribute predefined value; and
selecting a valid address to register with the peer-to-peer network.

19. The computer of claim 18, the memory storing instructions for performing the method comprising:
automatically updating the valid address when a host machine address changes.

20. The computer of claim 18, the memory storing instructions for performing the method comprising:
automatically updating the valid address in a new cloud when the new cloud is discovered.

* * * * *